Aug. 12, 1924.

A. L. McKELVEY

AIRCRAFT

Filed April 2, 1923

INVENTOR.
Archibald Lee McKelvey
BY
HIS ATTORNEYS.

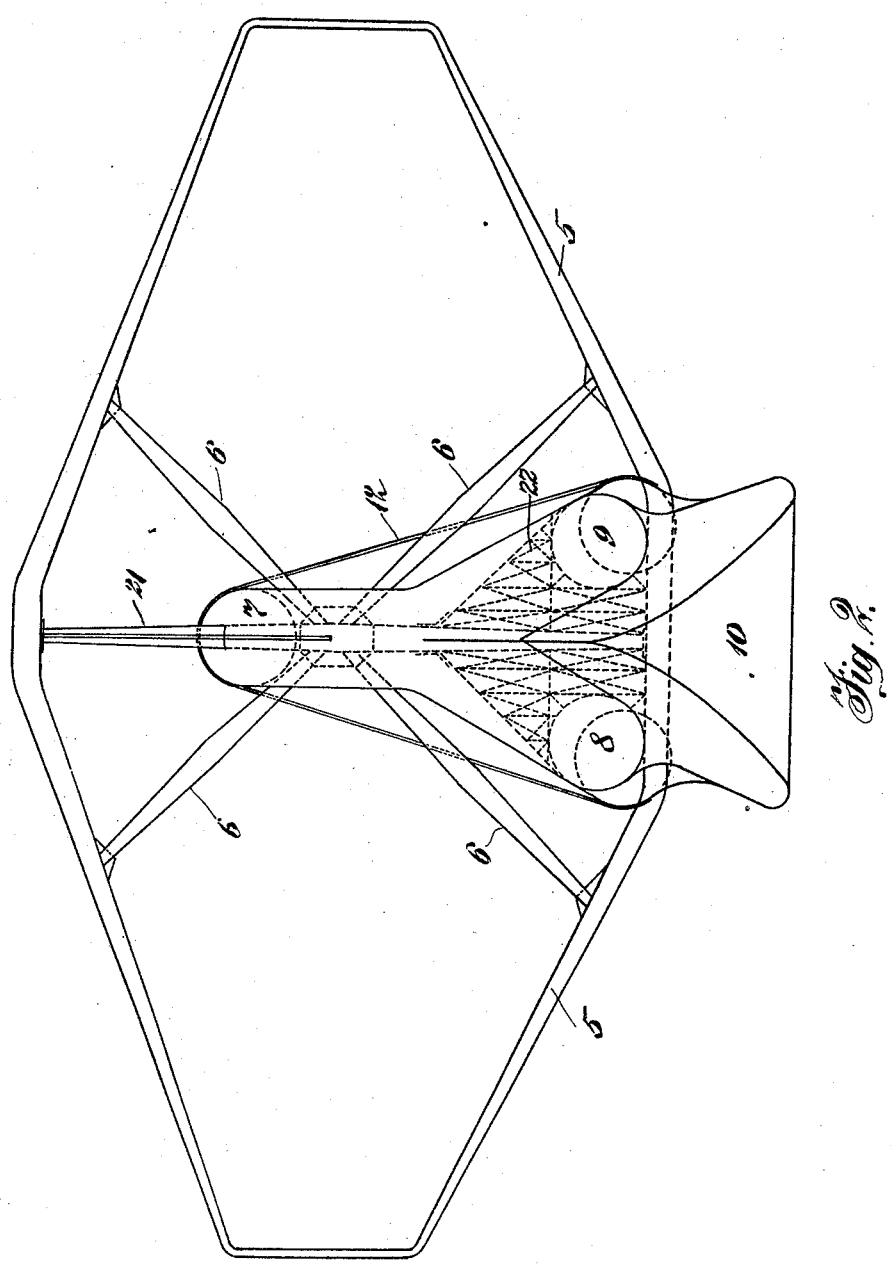

Aug. 12, 1924.
A. L. McKELVEY
AIRCRAFT
Filed April 2, 1923
1,504,895
3 Sheets-Sheet 3
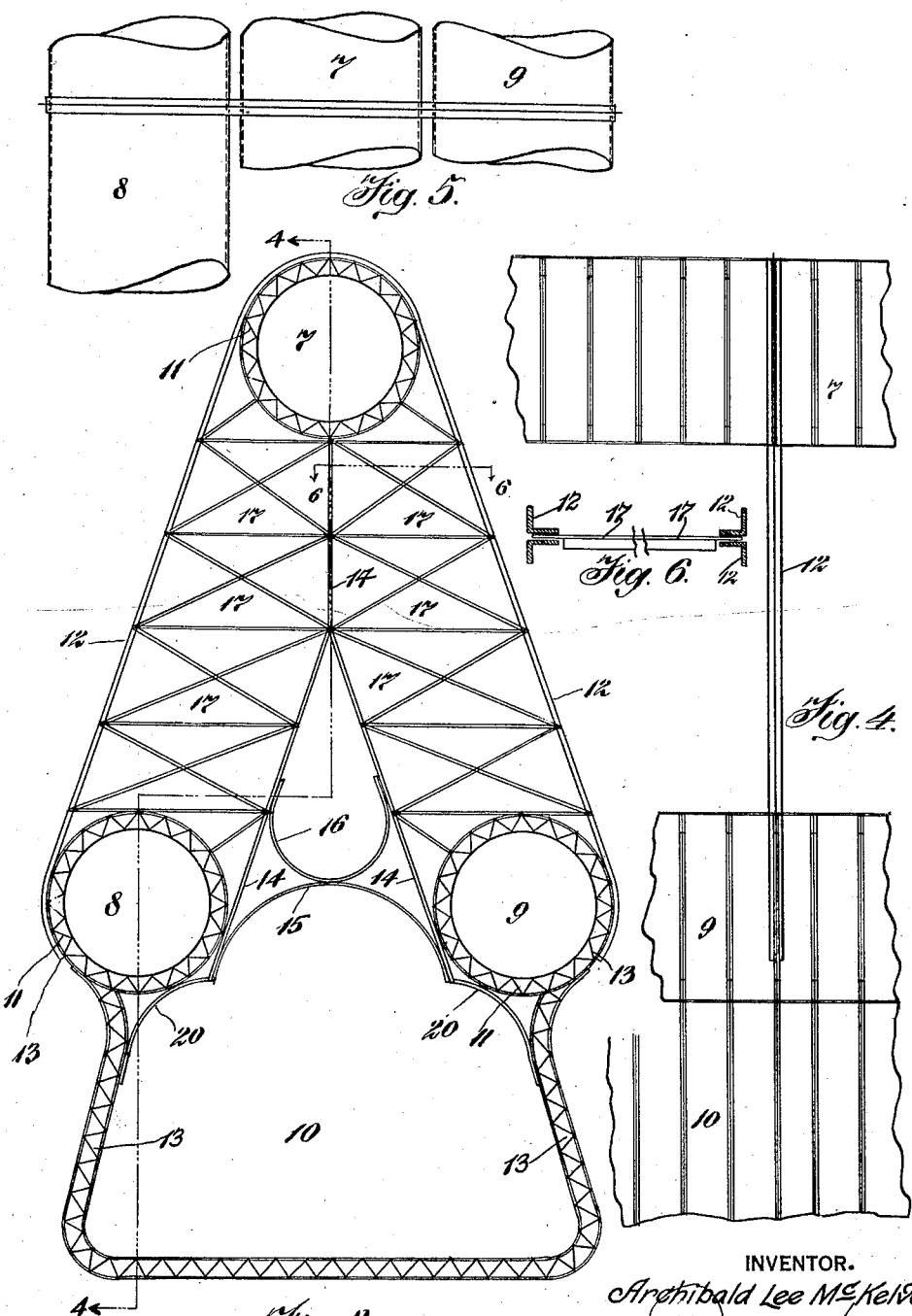

Patented Aug. 12, 1924.

1,504,895

UNITED STATES PATENT OFFICE.

ARCHIBALD LEE McKELVEY, OF ST. LOUIS, MISSOURI.

AIRCRAFT.

Application filed April 2, 1923. Serial No. 629,435.

*To all whom it may concern:*

Be it known that I, ARCHIBALD LEE MC-KELVEY, a citizen of the United States, residing at the city of St. Louis and State of Missouri, have invented a new and useful Aircraft, of which the following is a specification.

This invention relates to improvements in aircraft, and particularly to the frame structure thereof, and consists in the novel structure hereinafter more fully disclosed.

An object of the invention is to provide in an aircraft an open frame fuselage arranged in connection with a truss frame for the wing body, said frame being so designed as to have substantial rigidity coupled with lightness of structure.

A more specific object of the invention is to provide in an aircraft a fuselage comprising a long central body composed of converging longitudinals with connecting means between the longitudinals for bracing the same laterally and longitudinally to form a substantially rigid frame, together with means for connecting thereto a truss frame constituting a wing body of the craft.

Additional advantages will be apparent from the detailed description of the invention taken in connection with the accompanying drawings, in which Fig. 1 is a side elevation of an aircraft embodying my invention.

Fig. 2 is a front view, a portion of the structure being shown in dotted outline.

Fig. 3 is a central vertical section taken substantially on the line 3—3 of Fig. 1.

Fig. 4 is a cross section on the line 4—4 of Fig. 3.

Fig. 5 is a plan view of a section of the fuselage longitudinals, together with the connections or braces for the same.

Fig. 6 is a cross section on the line 6—6 of Fig. 3.

Figure 1:
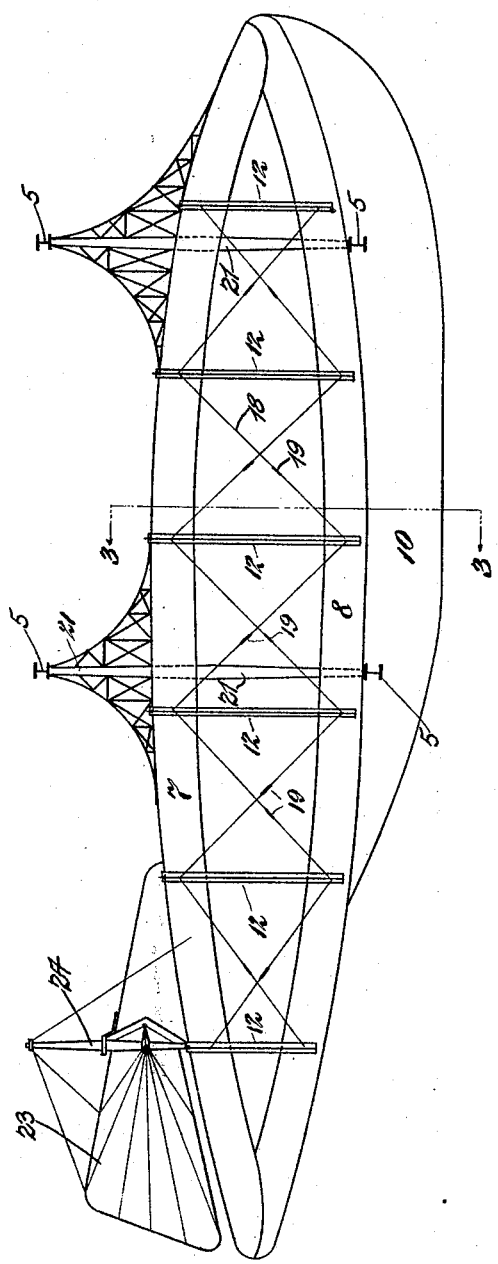

In the embodiment of the invention illustrated in the drawings the truss frame 5 constitutes a wing body for supporting the wings. As illustrated in the present embodiment there are two truss frames; one near the fore part of the craft and one aft from the central portion. These truss frames 5 are strengthened and braced by crossed rods 6.

The fuselage frame proper includes three longitudinals 7, 8 and 9 respectively, which are arranged in bowed formation, the ends of said longitudinals converging fore and aft and connected rigidly together at their converging points. These longitudinals are depended upon to give the main strength to the frame, and constitute the support for the hull member 10. Each of the longitudinals 7, 8 and 9 is preferably formed from spaced tubular walls bound together by V-shaped ribs 11. This structure results in imparting a great strength to the longitudinals coupled with the advantageous feature of lightness. The formation of the longitudinals constructed as described, and positioned and arranged in the bowed construction connected at the ends, permits the entire frame to be suspended mainly by the three longitudinals.

It is preferable also that the hull 10 be likewise constructed from spaced wall structure, reinforced by the ribs 11.

The longitudinals are tied together in their proper relationship so as to form a substantially rigid frame by means of arches including continuous members 12 which preferably comprise opposed angle iron bent to form a substantially U-shaped frame, the apex of which curves over the upper longitudinal 7, the ends of the lower arms of the frame 13 being curved to fit against the outer segment of the lower longitudinals 8 and 9 and being connected thereto by any suitable rigid connecting means, the ends terminating below the horizontal diameter of said longitudinals. The supporting arches further include counterbraced bars 14 bearing against the inner walls of the longitudinals 8 and 9. The bars 14 form a V-shaped inner wall for the lower part of the frame converging about midway of the height of the frame and extending upwardly to support the under face of the upper longitudinal 7. The lower spreading portions of the bars 14 are laterally braced by a yoke 15 and a component yoke 16, said yoke 15 being formed of a downwardly curved bar and the yoke 16 by an upwardly curved bar, said bars being connected at their contiguous faces and also connected at their free ends with the bars 14. A supporting frame of this character forms rigid bracing for holding the longitudinals in adjustment. The frame may be further strengthened by a series of struts 17 arranged in a rhomboid form.

The supporting frames for the longitudinals are arranged in spaced series and extend at substantially equal intervals vertically between the longitudinals. All of the frames are tied together by crossed tie wires 18 of high tensile strength, the lengths of wire between each pair of frames being provided with turn buckles 19 for controlling the tension thereof.

The hull 10 is connected to the lower longitudinals 8 and 9 by having the upper edges thereof rigidly connected to said longitudinals and, in order to further brace the connection between the hull and said longitudinals, there are provided brackets 20 formed from curved bars connected at one end to the inner face of the hull section below the upper edge thereof, and at the opposite ends to the ends of the bars 14.

The truss frames that constitute the wing supports are connected with the fuselage by masts 21, said masts extending through the upper longitudinal 7 and being connected with the lower longitudinals 8 and 9 by interlaced frames 22. In this manner the wing supports are rigidly carried by the fuselage body. The masts, in addition to serving as supports for the truss frame, constitute additional reinforcing members between the longitudinals.

The rudder structure 23 is supported on a shaft 24 mounted on the upper longitudinal near the aft end of the craft and function above the fuselage frame.

I am aware that the invention may be modified in numerous particulars without departing from the spirit and scope thereof. I do not limit myself unessentially, but what I claim and desire to secure by Letters Patent is:—

1. In an aircraft, a fuselage comprising as a unitary structure a plurality of longitudinals arranged to form the skeleton work of the frame, vertical frames arranged at spaced intervals adapted to tie the longitudinals together in a rigid structure, tensioning guy wires arranged between each pair of vertical frames and disposed in crossed relationship, and a hull section suspended from the frame.

2. In an aircraft, a fuselage comprising as a unitary structure a plurality of longitudinals arranged to form the skeleton work of the frame, vertical frames arranged at spaced intervals adapted to tie the longitudinals together in a rigid structure, tensioning guy wires arranged between each pair of vertical frames and disposed in crossed relationship, supports rigidly connected to the frame, and a truss structure carried by said supports, the said truss structure constituting the wing supporting member.

3. In an aircraft, a fuselage comprising as a unitary structure a plurality of longitudinals arranged to form the skeleton work of the frame, vertical frames arranged at spaced intervals adapted to tie the longitudinals together in a rigid structure, tensioning guy wires arranged between each pair of vertical frames and disposed in crossed relationship, a plurality of supports rigidly connected to the frame in spaced relationship, and truss members carried by each of said supports, said truss members constituting wing supporting members.

4. In an aircraft, a fuselage comprising as a unitary structure a plurality of longitudinals arranged to form the skeleton work of the frame, vertical frames arranged at spaced intervals adapted to tie the longitudinals together in a rigid structure, tensioning guy wires arranged between each pair of vertical frames and disposed in crossed relationship, supports rigidly connected to the frame, a truss structure carried by said supports, the truss structure constituting the wing supporting member, and a hull section suspended from the frame.

5. In an aircraft, a fuselage comprising as a unitary structure a plurality of longitudinals arranged to form the skeleton work of the frame, vertical frames arranged at spaced intervals adapted to tie the longitudinals together in a rigid structure, tensioning guy wires arranged between each pair of vertical frames and disposed in crossed relationship, a plurality of supports rigidly connected to the frame in spaced relationship, truss members carried by each of said supports, said truss members constituting wing supporting members, and a hull section suspended from the frame.

6. In an aircraft, a fuselage comprising a plurality of longitudinals arranged in a triangular position and comprising tubular members of spaced walls with reinforcement between the walls, vertical and transverse frames connected with all of said longitudinals and arranged in spaced relationship longitudinally of the frame, and means for tying said frames together.

7. In an aircraft, a fuselage comprising a plurality of longitudinals arranged in a triangular position and comprising tubular members of spaced walls with reinforcement betweens the walls, vertical and transverse frames connected with all of said longitudinals and arranged in spaced relationship longitudinally of the frame, means for tying said frames together, and a hull supported by the lower ones of said longitudinals, said hull comprising spaced walls with reinforcement therebetween.

8. In an aircraft, a fuselage comprising a plurality of longitudinals arranged in a triangular position and comprising tubular members of spaced walls with reinforcement between the walls, vertical and transverse frames connected with all of said longitudinals and arranged in spaced relationship longitudinally of the frame, means for tying said frames together, a support carried by the fuselage, and a wing supporting truss carried by said support.

9. In an aircraft, a fuselage comprising an open frame formed from longitudinal members arranged with two of said longitudinals on a horizontal line and one above the interval between said first-named longitudinals, said longitudinals comprising tubular sections converging fore and aft and connected together, frames locked to said longitudinals for bracing the same vertically and transversely, and tensioning means comprising guy members arranged in cross relationship connected with said frames for supporting said frames in proper alinement with said longitudinals.

10. In an aircraft, a fuselage comprising an open frame formed from longitudinal members arranged with two of said longitudinals on a horizontal line and one above the interval between said first-named longitudinals, said longitudinals comprising tubular sections converging fore and aft and connected together, frames locked to said longitudinals for bracing the same vertically and transversely, tensioning means associated with said frames for supporting said frames in proper alinement with said longitudinals, and a hull structure suspended from the lower ones of said longitudinals.

11. In an aircraft, a fuselage comprising an open frame formed from longitudinal members arranged with two of said longitudinals on a horizontal line and one above the interval between said first-named longitudinals, said longitudinals comprising tubular sections converging fore and aft and connected together, frames locked to said longitudinals for bracing the same vertically and transversely, tensioning means comprising guy members arranged in cross relationship connected with said frames for supporting said frames in proper alinement with said longitudinals, and a rudder structure extending vertically from the upper portion of the aft part of the frame.

ARCHIBALD LEE McKELVEY.